United States Patent [19]

Cohen et al.

[11] Patent Number: 5,440,416
[45] Date of Patent: Aug. 8, 1995

[54] OPTICAL NETWORK COMPRISING A COMPACT WAVELENGTH-DIVIDING COMPONENT

[75] Inventors: Leonard G. Cohen, Berkeley Heights; Charles H. Henry, Skillman; Rudolf F. Kazarinov, Martinsville; Henry H. Yaffe, Fanwood, all of N.J.

[73] Assignee: AT&T Corp., Murray Hill, N.J.

[21] Appl. No.: 21,698

[22] Filed: Feb. 24, 1993

[51] Int. Cl.⁶ ............................................ H04J 14/02
[52] U.S. Cl. ................................. 359/127; 359/130; 385/37; 385/24
[58] Field of Search ............... 359/114, 115, 117, 124, 359/125, 127, 129, 130, 131; 385/24, 27, 37, 46, 50

[56] References Cited

U.S. PATENT DOCUMENTS

| | | | |
|---|---|---|---|
| 4,902,086 | 2/1990 | Henry et al. | 350/96.12 |
| 4,923,271 | 5/1990 | Henry et al. | 385/37 |
| 5,026,131 | 6/1991 | Jannson et al. | 385/37 |
| 5,136,671 | 8/1992 | Dragone | 385/46 |
| 5,243,672 | 9/1993 | Dragone | 385/37 |

OTHER PUBLICATIONS

C. Dragone et al., "Efficient Multichannel Integrated Optics Star Coupler on Silicon", IEEE Photon. Technol. Lett. 1, 1989, 241–243.
C. Dragone et al., "Integrated Optics N X N Multiplexer on Silicon", IEEE Photon. Technol. Lett. 3, 1991, 896–899.
C. Dragone, "Efficient N X N Star Couplers Using Fourier Optics", IEEE J. Lightwave Technol. 7, 1989, 479–489.
R. Adar et al., "Wide-Band Bragg Reflectors made with Silica on Silicon Waveguides", Appl. Phys. Lett. 60, 1992, 1924–1926.
T. L. Koch et al., "Continuously Tunable 1.5 um Multiple-Quantum-Well AlInAs/GaInAsP Distributed--Bragg-Reflector Lasers", Eelct. Lett. 24, 1988, 1431–1432.
U. Koren, et al. "High Power Laser-Amplifier Photonic Integrated Circuit for 1.48 um Wavelength Operation", Appl. Phys. Lett. 59, 1991, 2351–2353.
U.S. patent application Ser. No. 07/806,561, "Optical Fiber Communication System", filed by L. G. Cohen et al. Dec. 12, 1991.

*Primary Examiner*—Leo H. Boudreau
*Assistant Examiner*—Rafael Bacares
*Attorney, Agent, or Firm*—Martin I. Finston

[57] ABSTRACT

An optical communication network includes a novel, passive optical component. This component combines the function of a splitter with the function of a wavelength-division multiplexer. These functions are performed in distinct wavelength bands. In one embodiment, the inventive component is made using silicon optical bench technology.

6 Claims, 3 Drawing Sheets

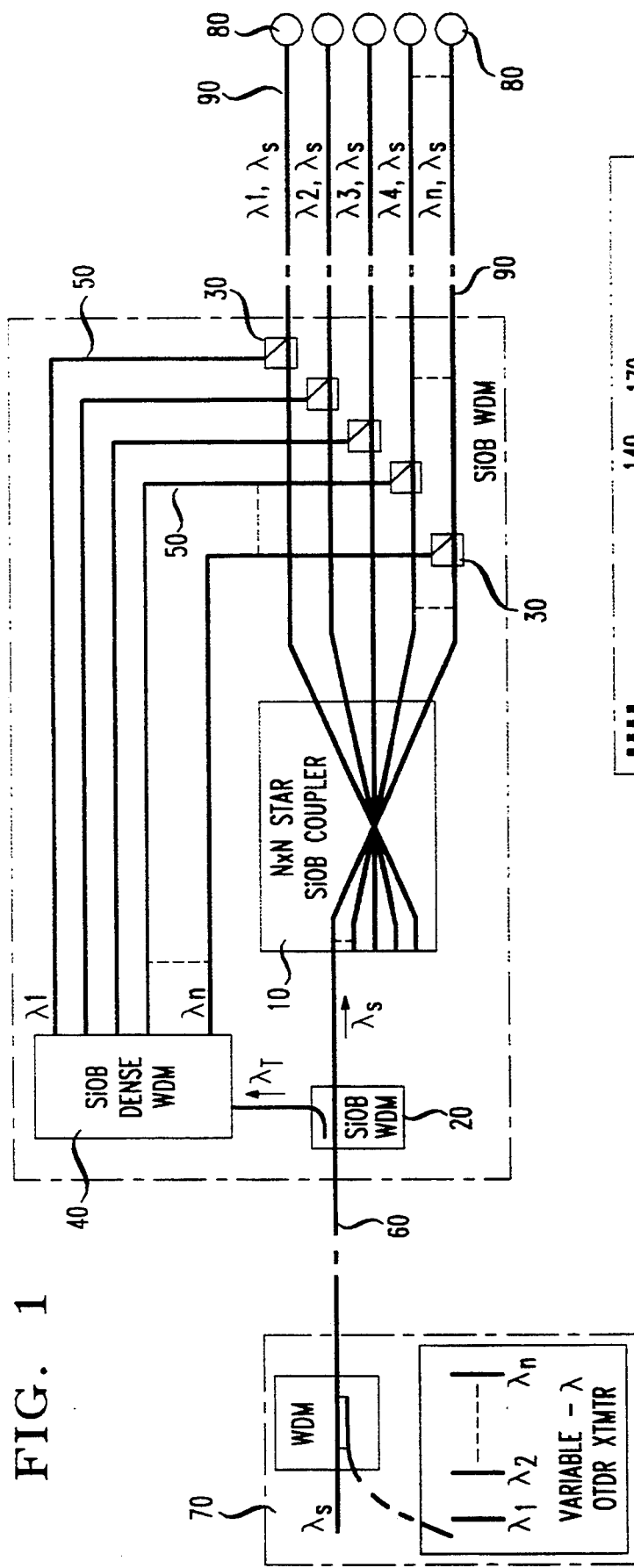
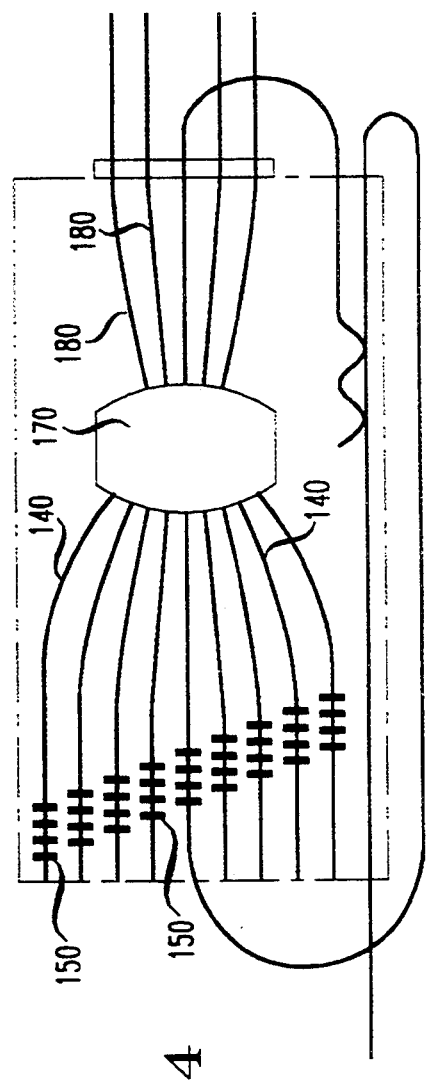
FIG. 1
FIG. 4

OPTICAL NETWORK COMPRISING A COMPACT WAVELENGTH-DIVIDING COMPONENT

FIELD OF THE INVENTION

The invention relates to fiber-optic communication networks, and more particularly to those networks that include passive components for routing and distributing optical transmissions.

ART BACKGROUND

Optical fiber networks are increasingly important for the distribution of telephonic signals. Such systems generally involve a plurality of feeder fibers that emanate from a central office and terminate at respective remote terminals. Optical signals are transmitted over distribution fibers between each of these remote terminals and a plurality of optical network units (ONUs). Signals are transmitted optically or electrically between each ONU and, typically, 4–12 customer premises.

Several network architectures have been proposed for transmitting signals between the remote terminals and the ONUs. One such architecture is the passive optical network (PON). In a PON, passive components are used to exchange signals between the feeder and distribution fibers. For example, a 1×N broadcast coupler or a 1×N wavelength-division multiplexer (WDM) is typically used to distribute an outbound signal from one feeder fiber into many (N is typically 16) distribution fibers.

For simplicity, the descriptions of PONs included herein will often assume that signal transmission is bidirectional along each of the optical fibers of the PON. However, these discussions are meant to include unidirectional PONs as well. Bidirectional communication is readily achieved by operating an outbound, unidirectional PON in conjunction with an inbound, also unidirectional PON.

Some proposed PON networks will carry both narrowband telephonic transmissions, and also broadband transmissions (such as cable television or high-definition television transmissions). However, distribution losses in a broadcast splitter (such as coupler 10 of FIG. 1) which are tolerable for narrowband transmission may, nevertheless, result in inadequate signal levels for reception in (generally less sensitive) broadband receivers. Depicted in FIG. 1 is a PON configuration in which broadcast signals (which will typically be narrowband signals) are distributed by N×N coupler 10. Additionally, signals in specified signal channels (distinguished by wavelength) are bypassed around coupler 10 and delivered to specific ONUs. (These signals are typically broadband signals.) This configuration minimizes distribution losses in the broadband signals.

The PON configuration of FIG. 1 is described in co-pending U.S. patent application Ser. No. 07/806,561, "Optical Fiber Communication System", filed by L. G. Cohen et al. on Dec. 12, 1991. Briefly, the bypass arrangement is based on coarse, upstream WDM 20, plural coarse downstream WDMs 30, dense WDM 40, and plural bypass lines 50 which may be, e.g., optical fibers or planar waveguides. Each coarse WDM separates transmissions into, e.g., two relatively wide wavelength channels. One of these channels, to be referred to as Ch. 1, will typically correspond to the 1280–1340 nm and 1500–1560 nm wavelength regions. The other channel, to be referred to as Ch. 2, will typically correspond to the 1420–1450 nm region or the 1570–1600 nm region. Dense WDM 40 separates the Ch. 2 transmissions which it receives from coarse WDM 20 into plural (typically 16) subchannels. Each subchannel has a relatively narrow spectral width, typically about 2 nm.

For outbound, broadband transmission, one or more lasers at central office 70 are selected or tuned to transmit at the broadband wavelengths assigned to selected ONUs 80. Coarse and dense WDMs at the central office are used to couple these transmissions into (and out of) feeder fiber 60. For inbound, broadband transmission, a laser at each ONU is selected or tuned to transmit at the broadband wavelength assigned to that ONU. Three-decibel directional couplers are readily provided for insertion and extraction of signals at the ends of bidirectional feeder fibers 60 and distribution fibers 90.

As discussed in U.S. patent application Ser. No. 07/806,561, cited above, silicon optical bench (SiOB) technology can be used to integrate the coarse and dense WDMs and the broadcast coupler on a single, silicon substrate. The resulting package would have the form of a silicon chip with optical fiber-array pigtails for making optical connections to the feeder and distribution fibers. This type of package offers considerable convenience in housing and handling.

Further miniaturization of the components on such a chip is desirable in order to minimize the total volume of components that need to be housed at, e.g., a curbside location.

SUMMARY OF THE INVENTION

We have invented an implementation of the network of FIG. 1 which includes a silicon chip having a compact component for broadcast and wavelength-selective signal distribution. The design of this component uses space efficiently by taking advantage of the mirror symmetry of conventional multichannel WDMs made by SiOB techniques. In the inventive implementation, only that portion of the WDM lying on one side of the mirror plane is retained. Reflectors which effectively lie in the mirror plane reflect optical signals back through the retained portion. The same component also functions as broadcast coupler 10 of FIG. 1. As a consequence, only one passive element needs to be formed on the silicon substrate. (A coarse, two-channel WDM is also required. This is optionally integrated on the silicon substrate. Alternatively, it can be made as a separate, exemplarily fiber-based, component.)

Accordingly, the invention in one aspect involves an optical communication network, which comprises: a primary transmitter for sending primary optical signals having at least one primary wavelength from a central location to plural remote locations; and a secondary transmitter for sending secondary optical signals, having plural secondary wavelengths, from the central location to the remote locations. Each of the remote locations corresponds to a particular secondary wavelength. The network further comprises a plurality of optical fibers, each having an upstream end and a downstream end; input means for optically coupling the upstream ends to the primary and secondary transmitters; and output means for optically coupling the downstream end of each of the fibers to a receiver at one of the remote locations. The input coupling means comprise an optical coupler which includes a first plurality of waveguides, to be denoted "A waveguides", a second plurality of waveguides, to be denoted "B waveguides", and a transmissive region intermediate and optically coupled to the A and B waveguide pluralities. At least two B waveguides, to be denoted "output waveguides", are optically coupled to respective optical fibers. At least one A waveguide is optically coupled to the primary transmitter, whereby primary signals are distributed into the the output waveguides.

In contrast to networks of the prior art, at least one B waveguide is optically coupled to the secondary transmitter. Moreover, at least two A waveguides have different lengths and terminate, distal the intermediate region, at reflective regions such that the optical coupler selectively directs secondary signals of at least some wavelengths into particular output waveguides according to wavelength.

BRIEF DESCRIPTION OF THE DRAWINGS

FIG. 1 is a schematic drawing of an illustrative passive optical communication network in which signals in a primary wavelength band are broadcast, via a broadcast coupler, to multiple remote locations, and signals in at least one secondary wavelength band bypass the broadcast coupler and are transmitted only to selected remote locations.

FIG. 4 is a schematic drawing of an alternate embodiment of the inventive passive element, in which a reflective function is performed by Bragg reflectors.

DETAILED DESCRIPTION

Figure 2:
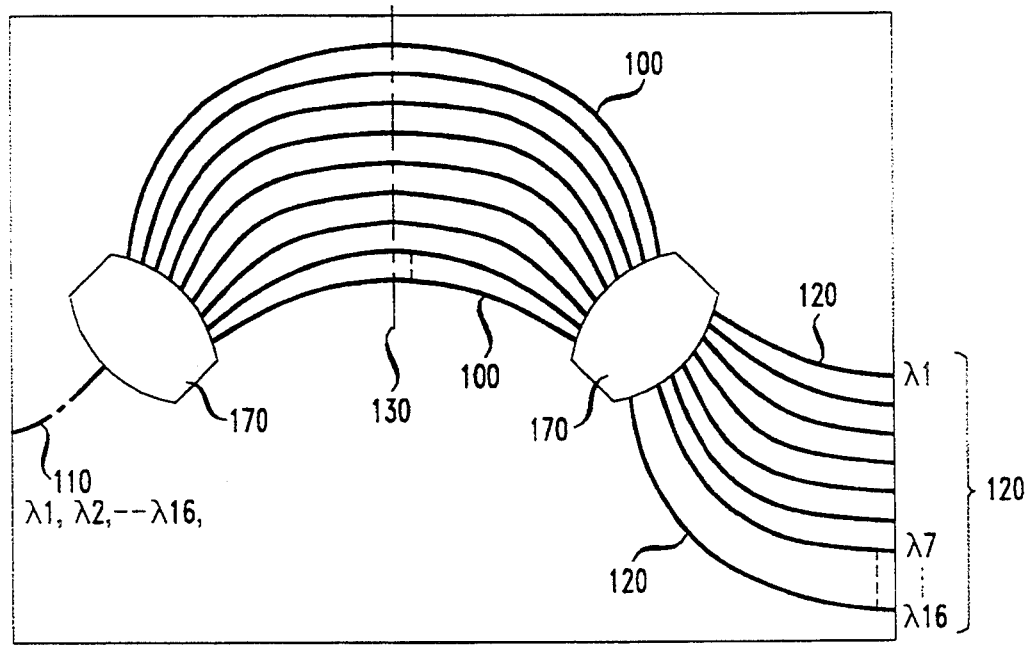
FIG. 2 is a schematic drawing of a multichannel WDM made according to silicon optical bench techniques of the prior art.

Depicted in FIG. 2 is a multichannel, dense, 1×N WDM made according to silicon optical bench methods of the prior art. Components of this kind are described, for example, in C. Dragone et al., "Efficient Multichannel Integrated Optics Star Coupler on Silicon", *IEEE Photon. Technol. Lett.* 1 (1989) 241–243, and in C. Dragone et al., "Integrated Optics N×N Multiplexer on Silicon", *IEEE Photon. Technol. Lett.* 3 (1991) 896–899. Free-space N×N star couplers, made using similar technology, are described in C. Dragone, "Efficient N×N Star Couplers Using Fourier Optics", *IEEE J. Lightwave Technol.* 7 (1989) 479–489. Briefly, the WDM of FIG. 2 is an interferometric device. In effect, two N×M couplers are interconnected by a plurality of waveguides 100 having different lengths. As a consequence, signals of various wavelengths that are input to the WDM on waveguide 110 are distributed into output waveguides 120 such that signals falling in different wavelength bands are distributed to different output waveguides. Illustratively, such a component can be used to multiplex signals in 16 or more different wavelength subchannels, with a subchannel separation of 1–2 nm, a cross-talk level of about −20 to −40 dB, and insertion loss of about 2.5 dB. The output wavelength bands are expected to exhibit a temperature drift of only about 0.014 nm/° C., permitting operation at remote, e.g., curbside, locations.

Figure 3:
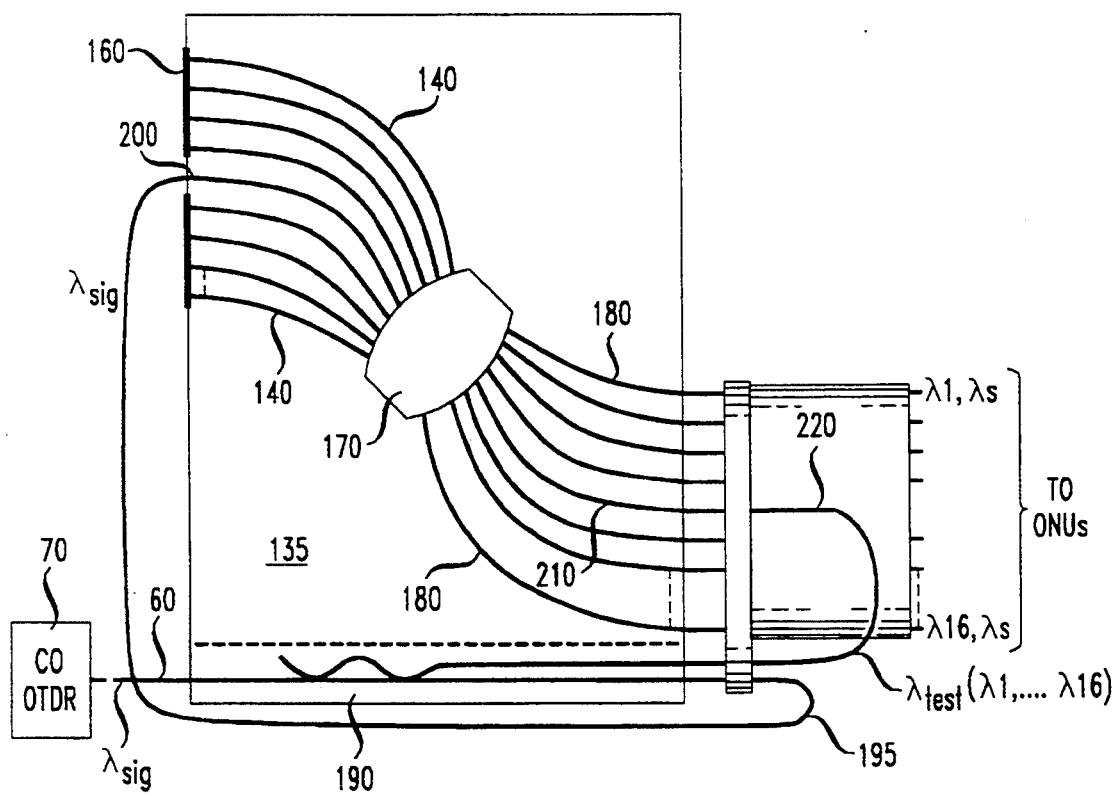
FIG. 3 is a schematic drawing of passive optical element, according to one embodiment of the invention, which performs broadcast and wavelength-selective signal distribution.

The WDM array of FIG. 2 is substantially symmetrical about plane 130, indicated as a dashed line in the figure. As a consequence, a more compact WDM can be derived from the WDM of FIG. 2 by removing that portion of the WDM that lies to the left of plane 130 (as viewed in the figure) and replacing it by a reflector or series of reflectors that reflect light back along the remaining portions of waveguides 100. This arrangement is depicted as optical element 135 of FIG. 3. In FIG. 3, waveguides 140, which have varying lengths, are shown terminated by a reflecting surface. This arrangement can be made, e.g., by first fabricating the full WDM of FIG. 2. The silicon substrate of this WDM is then, e.g., sawed along plane 130, and the resulting face 160 is polished. To prevent high optical loss, this face is desirably coated with a reflective material. For example, a metallic mirror usefully covers the ends of all of waveguides 140 except for the central waveguide 200. Alternatively, a multilayer dielectric mirror covers all of the waveguides, including waveguide 200. This mirror coating is designed to transmit the primary signals and reflect the secondary signals.

Since all of waveguides 140 are parallel at this face, small translations of face 160 to the left or right (as viewed in the figure) of ideal minor plane 130 will not have a significant effect on the operation of the WDM. Instead, the most significant source of alignment error is the angle $\delta\Theta$ between face 160 and plane 130 (i.e., the deviation from 90° of the angle between face 160 and the longitudinal waveguide axis). If $\delta\Theta$ is not zero, the path-length differences between the various waveguides 140 will deviate from their design values, leading to a wavelength shift $\delta\lambda$, of the WDM subchannels. Illustratively, $\delta\lambda$ can be made less than 0.5 nm in a WDM operating at a wavelength of 1.55 $\mu$m and having path-length differences that vary in units of 150 $\mu$m, if $\delta\Theta$ is less than about 0.017°. In fact, we believe that during lithographic processing of the WDM, it will be possible to align the waveguides, relative to the cleaved face, within a tolerance of 13 $\mu$m (0.5 mil) over a range of about 6 cm (i.e., over the usable length of a 10-cm silicon wafer). This is equivalent to an angular tolerance of 0.012° for wafers of this size. Thus, we believe that the required degree of alignment is readily achieved.

An alternative to the use of a reflective surface is depicted in FIG. 4. In this embodiment, a Bragg reflector 150 is formed near the end of each of waveguides 140. The required length difference between adjacent waveguides is established by precisely situating each Bragg reflector relative to that end of the waveguide that adjoins free-space region 170. (Region 170 is referred to as a "free-space region" because it is transmissive by one-dimensional waveguiding in a slab-like geometry, rather than by two-dimensional waveguiding. This region separates waveguides 140 from waveguides 180. In the absence of interference effects, a signal incident on the free-space region from one of waveguides 140 will be broadcast into all of waveguides 180, and vice versa.) For simplicity of manufacture, all of Bragg reflectors 150 are equivalent, and each is reflective over a relatively broad wavelength range, exemplarily about 30 nm. A Bragg reflector having such a spectral range will typically be about 45 $\mu$m long. Bragg reflectors for planar optical waveguides are described, for example, in R. Adar et al., "Wide-Band Bragg Reflectors made with Silica on Silicon Waveguides", *Appl. Phys. Lett.* 60 (1992) 1924–1926.

One advantage of the device of FIG. 4 is that it can generally be made more compactly than the devices of FIGS. 2 and 3. In particular, the relative (total) lengths of waveguides 140 are not critical, and therefore the arrangement of the waveguides and the free-space region can be selected to make efficient use of space on the substrate. Because this device is relatively compact, relatively many such devices can be formed on a single wafer. Moreover, time-consuming sawing and polishing steps are avoided because unlike a mirror surface, the Bragg reflectors can be delineated by photolithography.

The operation of the optical element of FIG. 3 will now be described. At central office 70, two kinds of optical signals, occupying different wavelength bands, can be injected into feeder fiber 60. These signals are denoted "primary signals", assigned to Ch. 1 as discussed above, and "secondary signals", assigned to Ch. 2. The primary and secondary signals are separated by 2-channel WDM 190, analogous to WDM 20 of FIG. 1. In one embodiment, coarse WDM 190 is integrated on the same substrate as optical element 135, using silicon optical bench techniques. In an alternate embodiment, coarse WDM 190 is a separate, exemplarily optical-fiber-based, component optically coupled to element 135 by an optical fiber.

After passing through WDM 190, the primary signals are delivered to waveguide 200, which will typically be the center waveguide of the waveguide array that includes waveguides 140. These primary signals are exemplarily delivered by optical fiber 195, which is coupled at one end to the Ch. 1 output port at the output end of WDM 190, and at the other end to the terminus of waveguide 200 at face 160. Fiber 195 may be aligned to waveguide 200 through an uncoated, central slot in face 160, or through a dielectric-coated mirror, as discussed above. With respect to the primary signals in waveguide 200, element 135 functions as a broadcast coupler, and distributes these signals into all of waveguides 180, which are optically coupled to distribution fibers 90 of FIG. 1. In performing this function, element 135 is analogous to broadcast coupler 10 of FIG. 1. Although a single input fiber 195 is shown in the figure, multiple such input fibers are also readily provided and coupled to multiple waveguides 200.

The secondary signals are split off from the primary signals in WDM 190. The secondary signals are then directed into waveguide 210, which will typically be the center waveguide of the array which includes waveguides 180. These secondary signals are exemplarily delivered by optical fiber 220, which is optically coupled at one end to the Ch. 2 output port at the output end of WDM 190 and at the other end to the end of waveguide 210 distal free-space region 170. With respect to these secondary signals, element 135 functions as a dense WDM. As a result, secondary signals in each subchannel are directed into a particular one of waveguides 180, and from each such waveguide into a corresponding distribution fiber 90. In performing this function, element 135 is analogous to dense WDM 40 in combination with coarse WDMs 30 of FIG. 1. Although a single input fiber 220 is shown in the figure, multiple such input fibers are also readily provided and coupled to multiple waveguides 210.

Significantly, element 135 can be made without any waveguide crossovers, and thus crossover losses and crosstalk can be avoided. Typically, waveguides 140 will number about 65 for, e.g., a 1×17 WDM. The same number of waveguides 180 will also generally be available; however, to avoid signal crosstalk, it will often be advisable to use, e.g., only one-fourth of those waveguides. Thus, those waveguides 180 that are active will typically number about 16, and will therefore couple to distribution fibers serving, typically, 16 ONUs. As noted, coarse WDM 190 is optionally a Mach-Zehnder WDM integrated on the same substrate as element 135. An optional, second coarse WDM is readily incorporated on the same substrate and concatenated with WDM 190 to further isolate Ch. 1 from Ch. 2.

As noted, the Ch. 1 signals are delivered from WDM 190 to the input end of waveguide 200. This is most simply accomplished by removing the reflective material (if used) from the end of the waveguide. However, if this end is not reflective, waveguide 200 will not participate with waveguides 140 as part of the grating region of element 135 (functioning as a WDM). As a consequence, the passband corresponding to each of the subchannels will be broadened by an enhancement of sidelobe structure adjacent the corresponding transmission peak. This, in turn, can increase the crosstalk between adjacent channels. Roughly speaking, removing the central waveguide from the grating will add about of crosstalk, where M is the number of waveguides 140 in the grating region. This contribution can be reduced by including an appropriate, reflective, dielectric coating on the end of waveguide 200, or by including a Bragg reflector having a passband exemplarily about 30 nm wide.

Table 1 lists the estimated optical losses in the network of FIG. 1 and the network of FIG. 3. The losses in the network of FIG. 3 are calculated assuming 100% reflection at the sawed and polished edge of element 135.

Because element 135 must function as both a broadcast coupler (which splits optical power among multiple outputs) and a WDM, there is a design tradeoff between insertion loss (which is important for power management) and interchannel crosstalk. As noted, crosstalk can be reduced by increasing the spacing between adjacent (active) waveguides. However, this tends to increase the insertion loss. For example, we have estimated that a reduction of crosstalk from −10 dB to −40 dB will increase the insertion loss by 3 dB. This 3-dB penalty is included in the entry of Table 1 for broadcast loss in the 16×16 star coupler.

Figure 6:
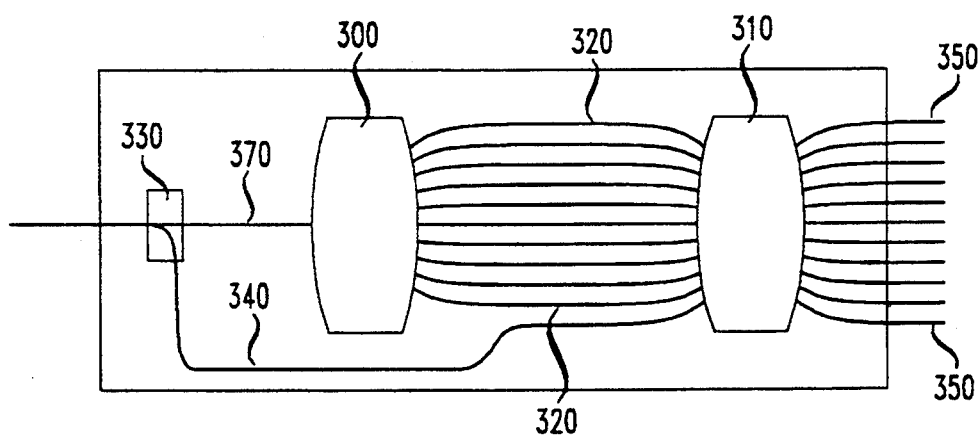
FIG. 6 shows a variation of the optical element of FIG. 5.

As noted, in one application of element 135, the secondary signals are video-on-demand transmissions such as cable television transmissions. In another application, the secondary signals are diagnostic transmissions from an optical time-domain reflectometry unit (OTDR) housed, e.g., at the central office. Conventional ODTR-based diagnostic techniques are not effective for diagnosing problems that originate at points downstream of a broadcast coupler such as coupler 10 of FIG. 1. This is because backscattered signals from each of the distribution fibers will overlap in time when they are received by the OTDR detector at the central office. Moreover, the loss of optical power which is suffered by dividing the outbound OTDR signal among, e.g., 16 distribution fibers can reduce the signal level below a practical level for detection and analysis. However, these problems are avoided by transmitting OTDR signals in different wavelength subchannels. These transmissions are not broadcast. Instead, an optical element such as element 135 of FIG. 6 is used to direct each transmission into the distribution fiber assigned to the corresponding subchannel. As a result, broadcast losses are avoided in these transmissions.

A variable-wavelength OTDR transmitter is needed to produce diagnostic signals in multiple wavelength subchannels. One suitable light source for such a transmitter is a group of narrow-line lasers, each emitting light at a discrete wavelength. An alternate, and more preferable, light source includes one or more distributed Bragg reflector (DBR) lasers, each having a tuning range of about 8–10 nm. Suitable DBR lasers are described, e.g., in T. L. Koch et al., "Continuously Tunable 1.5 $\mu$m Multiple-Quantum-Well AlInAs/GaInAsP Distributed-Bragg-Reflector Lasers", *Elect. Lett.* 24 (1988) 1431–1432. The laser power can be increased (by as much as about 7 dB, according to our estimates) by integrating such a laser with a semiconductor optical amplifier. Integration of this kind is described, for example, in U. Koren, et al., "High Power Laser-Amplifier Photonic Integrated Circuit for 1.48 $\mu$m Wavelength Operation", *Appl. Phys. Lett.* 59 (1991) 2351–2353.

Figure 5:
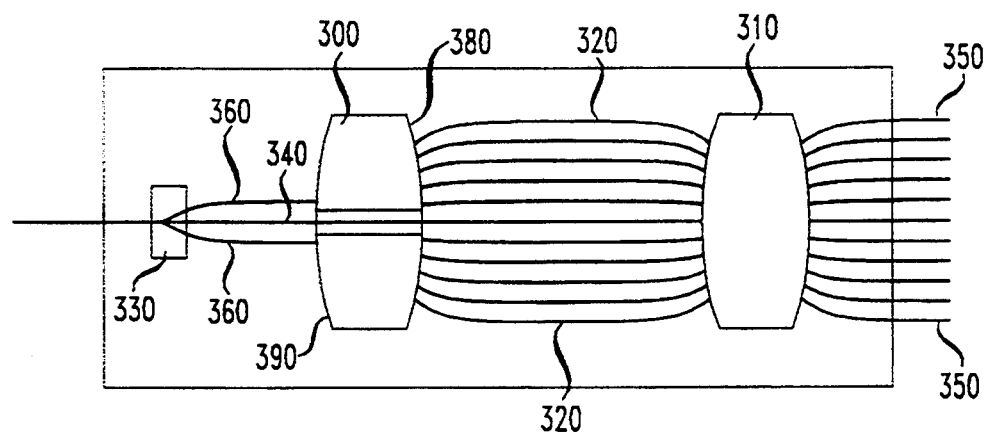
FIG. 5 is a schematic drawing of a passive optical element, according to an alternate embodiment of the invention in which the use of a bypass waveguide separates signals for broadcast distribution from signals for wavelength-selective distribution.

According to an alternate embodiment of the invention, the fully bilateral WDM of FIG. 2 is used instead of the folded WDM of FIG. 3. Turning to FIGS. 5 and 6, such a WDM includes first transmissive region 300, second transmissive region 310, and waveguides 320 which have different lengths and are optically coupled to regions 300 and 310. Coarse WDM 330 directs primary signals to region 310 through bypass fiber 340, without substantial optical coupling of these signals into region 300. As a consequence, these signals are broadcast into optical fibers 350 without wavelength selection. By contrast, coarse WDM 330 directs secondary signals into region 300 through waveguides 360 or waveguide 370. As a consequence, these signals are selectively distributed into particular fibers 350 according to wavelength.

In the embodiment of FIG. 5, region 300 is divided into an upper part 380 and a lower part 390 (as viewed in the figure), separated by a gap. Waveguide 340 passes through the gap without substantial optical coupling to region 300.

lengths, from the central location to the remote locations, each of the remote locations corresponding to one of the secondary wavelengths;
c) a plurality of optical fibers, each having an upstream end and a downstream end;
d) input means for optically coupling the upstream ends to the primary and secondary transmitters; and
e) output means for optically coupling the downstream end of each of the optical fibers to a receiver situated at one of the remote locations, wherein:
f) the input coupling means comprise an optical coupler which includes a first plurality of waveguides, to be denoted "A waveguides"; a second plurality of waveguides, to be denoted "B waveguides"; and a transmissive region intermediate and optically coupled to the A and B waveguide pluralities;
g) at least two B waveguides, to be denoted "output waveguides", are optically coupled to respective optical fibers of the fiber plurality; and
h) at least one A waveguide is optically coupled to the primary transmitter, whereby primary signals are distributed into the the output waveguides;

CHARACTERIZED IN THAT
i) at least one B waveguide is optically coupled to the secondary transmitter such that secondary transmissions pass through said B waveguide into the intermediate transmissive region, and from the intermediate transmissive region into the A waveguides; and
j) with respect to at least some secondary wavelengths, at least two A waveguides have different lengths and terminate, distal the intermediate region, at reflective regions such that the optical coupler selectively directs at least some secondary signals into particular output waveguides according to wavelength.

2. The network of claim 1, wherein the optical coupler comprises a silicon substrate having a principal surface, and the A and B waveguides are planar waveguides formed on the principal surface.

3. The network of claim 2, wherein the substrate has an edge perpendicular to the principal surface, and the

TABLE 1

| | LOSS BUDGET (1X16 PON with SiOB WDM coupler bypass circuit) | | | |
|---|---|---|---|---|
| | FIG. 1 NETWORK | | FIG. 3 NETWORK | |
| COMPONENT | BROADCAST (dB) | WDM BYPASS (dB) | BROADCAST (dB) | WDM BYPASS (dB) |
| SiOB Coarse 2-ch WDM (coupler input bypass) | 0.6 | 0.6 | 0.6 | 0.6 |
| SiOB Dense 16-ch WDM | — | 2.5 | — | 3.5 |
| SiOB Coarse 2-ch WDM (coupler output bypass) | 0.6 | 0.6 | — | — |
| SiOB Waveguide Cross-overs (worst case = 15) | 1.5 | 1.5 | — | — |
| 16 × 16 Star Coupler | 15.0 | — | 18.0 | — |
| Fiber Loss - Outside Plant ($\lambda$ = 1430–1460 nm) | 4.0 | 4.0 | 4.0 | 4.0 |
| Splice Loss - Outside Plant | 5.6 | 5.6 | 5.6 | 5.6 |
| TOTAL LOSS (dB) | 27.3 | 14.8 | 28.2 | 13.7 |

We claim:
1. An optical communication network, which comprises:
a) a primary transmitter for sending primary optical signals having at least one primary wavelength from a central location to plural remote locations;
b) a secondary transmitter for sending secondary optical signals, having plural secondary wave-

A waveguides terminate at the edge.
4. The network of claim 2, wherein each of the reflective regions is a distributed Bragg reflector formed in one of the A waveguides.
5. An optical communication network, which comprises:

a) a primary transmitter for sending primary optical signals having at least one primary wavelength from a central location to plural remote locations;

b) a secondary transmitter for sending secondary optical signals, having plural secondary wavelengths, from the central location to the remote locations, each of the remote locations corresponding to one of the secondary wavelengths;

c) a plurality of optical fibers, each having an upstream end and a downstream end;

d) input means for optically coupling the upstream ends to the primary and secondary transmitters; and e) output means for optically coupling the downstream end of each of the optical fibers to a receiver situated at one of the remote locations, wherein:

f) the input coupling means comprise a Mach-Zehnder interferometer having: first and second transmissive regions; a plurality of waveguides of different lengths, to be denoted "A waveguides," extending between and optically coupled to the first and second transmissive regions; and a plurality of waveguides, to be denoted "B waveguides," each optically coupled at one end to the second transmissive region and at the other end to a respective one of the optical fibers;

CHARACTERIZED IN THAT g) the input coupling means further comprise an optical waveguide, to be referred to as the bypass waveguide, having an input end optically coupled to the primary transmitter and an output end optically coupled to the second transmissive region such that primary signals are distributed into the B waveguides but are not substantially distributed into the A waveguides; and h) the input coupling means further comprise means for optically coupling the secondary transmitter to the first transmissive region, whereby at least some secondary signals are selectively directed into particular B waveguides according to wavelength.

6. The network of claim 5, wherein the first transmissive region is divided into first and second parts separated by a gap; each of said parts is optically coupled to the secondary transmitter and to some of the A waveguides; and the bypass waveguide extends through the gap without substantial optical coupling to the first transmissive region.

* * * * *